United States Patent
Chen et al.

(10) Patent No.: US 10,202,701 B2
(45) Date of Patent: *Feb. 12, 2019

(54) POTASSIUM CRYOLITE FOR ALUMINUM ELECTROLYSIS INDUSTRY AND PREPARATION METHOD THEREOF

(71) Applicant: SHENZHEN SUNXING LIGHT ALLOYS MATERIALS CO., LTD, Baoan District, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN)

(73) Assignee: SHENZHEN SUNXING LIGHT ALLOYS MATERIALS CO., LTD., Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/160,663

(22) Filed: Jan. 22, 2014

(65) Prior Publication Data

US 2014/0131216 A1    May 15, 2014

Related U.S. Application Data

(62) Division of application No. 13/709,027, filed on Dec. 9, 2012.

(30) Foreign Application Priority Data

May 23, 2012 (CN) .......................... 2012 1 0161993

(51) Int. Cl.
*C25C 3/18* (2006.01)
*C01F 7/54* (2006.01)

(52) U.S. Cl.
CPC . *C25C 3/18* (2013.01); *C01F 7/54* (2013.01)

(58) Field of Classification Search
CPC ....................................................... C01F 7/54
See application file for complete search history.

(56) References Cited

U.S. PATENT DOCUMENTS

| 2,785,971 | A | * | 3/1957 | Kamlet | ............... C22B 34/1277 420/418 |
| 4,742,994 | A | * | 5/1988 | Zannini | ................. B22D 41/12 266/165 |
| 5,006,209 | A | * | 4/1991 | Beck | .......................... C25C 3/06 204/233 |
| 8,562,931 | B2 | * | 10/2013 | Chen | .......................... C01F 7/54 423/298 |
| 2008/0264596 | A1 | * | 10/2008 | Szente | .................... C22B 7/001 164/266 |
| 2013/0095023 | A1 | * | 4/2013 | Chen | .......................... C01F 7/54 423/298 |

OTHER PUBLICATIONS

Dedyukhin et al, "Electrical conductivity of the KF—NaF—AlF3 molten system at low cryolite ratio", The Electrochemical Society, 214th ECS Meeting, 2009.*
Danielik, V., "Phase equilibria in the system KF—AlF3—Al2O3", Chem. Pap., 2005, vol. 59, No. 2, pp. 81-84.*
Chen et al, Phase Diagram of the System KF—AlF3, Journal of the American Ceramic Society, vol. 83, No. 12, Dec. 2000, pp. 3196-3198.*
El-Mahallawy et al, On the reaction between aluminum, K2TiF6 and KBF4, Journal of Alloys and Compounds, No. 292, 1999, pp. 221-229.*
Ramachandran et al, Grain Refinement of Light Alloys, 68th World Foundry Congress, Feb. 2008, pp. 189-193 (Year: 2008).*

* cited by examiner

*Primary Examiner* — Harry D Wilkins, III
(74) *Attorney, Agent, or Firm* — Jackson IPG PLLC; Demian K. Jackson

(57) ABSTRACT

The invention provides a potassium cryolite for aluminum electrolysis industry, which has a molecular formula: $mKF \cdot AlF_3$, wherein m is from 1 to 1.5. The low-molecular-ratio potassium cryolite ($mKF \cdot AlF_3$, and m is from 1 to 1.5) provided by the invention is used for aluminum electrolysis industry, and can improve the dissolvability of aluminum oxide, thus reducing the temperature of electrolysis and the consumption of power, raising the efficiency of electrolysis and lowering the comprehensive production cost.

2 Claims, No Drawings

POTASSIUM CRYOLITE FOR ALUMINUM ELECTROLYSIS INDUSTRY AND PREPARATION METHOD THEREOF

TECHNICAL FIELD OF THE INVENTION

The invention relates to potassium cryolite, more particularly to a potassium cryolite for aluminum electrolysis industry and a preparation method thereof.

BACKGROUND OF THE INVENTION

The traditional Hall-Heroult method has still been employed in aluminum electrolysis industry so far and cryolite-aluminum oxide has served as the basic system for electrolyte all the time, and in this system, sodium hexafluoroaluminate is usually used as cryolite. The temperature of electrolysis in aluminum electrolysis industry is about 960° C., which leads to high consumption of power, this is mainly because of high primary crystal temperature of electrolyte, besides, in order to keep good solubility of aluminum oxide, the degree of superheat at a particular temperature needs to be kept.

The method for industrially preparing potassium fluoroaluminate (potassium cryolite) mainly is chemical synthesis method: fluoroaluminate is generated by the reaction between anhydrous hydrofluoric acid and aluminum hydroxide, then reacted with potassium hydroxide at high temperature, and finally filtered, dried, molten and crushed to obtain potassium fluoroaluminate product; the potassium fluoroaluminate, which is synthesized using such a method, has a relative molecular weight of 258.28, a molecular formula of $mKF.AlF3$ (m=3.0) and a melting point of 560-580° C. The potassium cryolite prepared using the current industrial synthesis methods generally has a molecular ratio m between 2.0 and 3.0, so it is difficult to prepare low-molecular-ratio potassium cryolite, which is pure and extremely low in water content and has a molecular ratio m between 1.0 and 1.5.

Therefore, the shortcomings like high power consumption in electrolysis and unsatisfactory electrolyte exist in the prior art.

SUMMARY OF THE INVENTION

To solve the technical problems in the prior art, the inventor has made tremendous researches on electrolyte selection and preparation method and has unexpectedly found that, the temperature of electrolysis in aluminum electrolysis industry can be reduced by using low-molecular-ratio potassium cryolite, which is prepared from the raw material of potassium fluotitanate, potassium fluoborate or the mixture thereof according to a thermo-chemical synthesis method, as electrolyte for aluminum electrolysis system, therefore, the consumption of power is reduced and the comprehensive production cost is lowered.

The invention provides a potassium cryolite for aluminum electrolysis industry, which has a chemical formula of $mKF.AlF3$, wherein m is from 1 to 1.5.

By adopting the technical proposal above, the low-molecular-ratio potassium cryolite ($mKF.AlF3$, and m is from 1 to 1.5) provided by the invention is used for aluminum electrolysis industry, and can improve the dissolvability of aluminum oxide, thus reducing the temperature of electrolysis and the consumption of power, raising the efficiency of electrolysis and lowering the comprehensive production cost.

As a further improvement of the invention, the m is 1, 1.2 or 1.5; the melting point of KF.AlF3 is about 555° C., the melting point of $6/5KF.AlF_3$ is about 556° C., and the melting point of $3/2KF.AlF_3$ is about 557° C.

The dissolubility of aluminum oxide in 3NaF.AlF3 molten liquid is about 7 g/L, and the dissolubility of aluminum oxide in $3/2KF.AlF_3$, KF.AlF3 and $6/5KF.AlF_3$ molten liquids is all within a range from 15 g/l to 20 g/l compared with sodium cryolite 3NaF.AlF3, so the dissolubility increased remarkably; the low-molecular-ratio potassium cryolites $3/2KF.AlF_3$, KF.AlF3 and $6/5KF.AlF_3$ can reduce the temperature of electrolysis, lower the consumption of power and improve the efficiency of electrolysis when used for aluminum electrolysis industry.

Correspondingly, the invention further provides a preparation method of potassium cryolite for aluminum electrolysis industry, comprising the following steps:

A) aluminum is put in a reactor, which is heated up to 700-850° C. and then added with potassium fluotitanate, potassium fluoborate or the mixture thereof; and B) after the mixture in the reactor is stirred for 4-6 hours, liquid molten at the upper layer is sucked out to obtain potassium cryolite.

The preparation method provided by the invention has the advantages of moderate reaction conditions, easy control, simple process flow, complete reaction and good quality of product.

As a further improvement of the invention, the preparation method of potassium cryolite for aluminum electrolysis industry comprises the following steps:

A) aluminum is put in a reactor that is a closed container, inert gas is fed into the reactor after evacuation, and the reactor is heated up to 780-850° C. and then added with potassium fluotitanate; and B) after the mixture in the reactor is stirred for 4-6 hours, liquid molten at the upper layer is sucked out to obtain potassium cryolite having a chemical formula: $3/2KF.AlF_3$. The chemical reaction formula involved is $3/4K_2TiF_6+Al=3/4Ti+3/2KF.AlF_3$.

As a further improvement of the invention, the preparation method of potassium cryolite for aluminum electrolysis industry comprises the following steps:

A) aluminum is put in a reactor that is a closed container, inert gas is fed into the reactor after evacuation, and the reactor is heated up to 700-850° C. and then added with potassium fluoborate; and B) after the mixture in the reactor is stirred for 4-6 hours, liquid molten at the upper layer is sucked out to obtain potassium cryolite having a chemical formula: KF.AlF3. The chemical reaction formula involved is $KBF4+Al=B+KF.AlF3$.

As a further improvement of the invention, the preparation method of potassium cryolite for aluminum electrolysis industry comprises the following steps:

A) aluminum is put in a reactor that is a closed container, inert gas is fed into the reactor after evacuation, and the reactor is heated up to 700-850° C. and then added with the mixture of potassium fluoborate and potassium fluotitanate based on a molar ratio of 2:1; and B) after the mixture in the reactor is stirred for 4-6 hours, liquid molten at the upper layer is sucked out to obtain potassium cryolite having a chemical formula: $6/5KF.AlF_3$. The chemical reaction formula involved is $K_2TiF_6+2KBF_4+10/3Al=TiB_2+10/3[6/5KF.AlF_3]$.

As a further improvement of the invention, the preparation method of potassium cryolite for aluminum electrolysis industry comprises the following steps:

A) aluminum is put in a reactor, which is heated up to 700-850° C. and then added with the mixture of potassium fluoborate and potassium fluotitanate based on a molar ratio of y: x; and B) after the mixture in the reactor is stirred for 0.5-6 hours, liquid molten at the upper layer is sucked out to obtain potassium cryolite having a chemical formula:

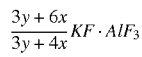

The chemical reaction formula involved is

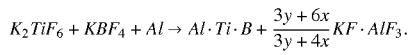

Compared with the prior art, the invention has the advantage that: the low-molecular-ratio potassium cryolite (mKF.AlF3, and m is from 1 to 1.5) provided by the invention, with a proper electric conductivity, is used for aluminum electrolysis industry, and can improve the dissolvability of aluminum oxide, thus reducing the temperature of electrolysis and the consumption of power, raising the efficiency of electrolysis and lowering the comprehensive production cost; the preparation method of low-molecular-ratio potassium cryolite provided by the invention is moderate in reaction conditions, easy in control, simple in process flow, complete in reaction and good in quality of product.

DETAILED DESCRIPTION OF THE EMBODIMENTS

Further detailed description is made to the invention with reference to the embodiments below.

Embodiment 1

1 ton of aluminum is weighed and put in a reactor that is a closed container, argon is fed into the reactor for the purpose of protection after evacuation, the reactor is heated up to 800° C. and then slowly added with dry potassium fluotitanate based on a reaction proportion, sponge titanium and potassium cryolite) ($3/2KF.AlF_3$) are generated after the mixture in the reactor is rapidly stirred for 5 hours, the cover of the reactor is opened and liquid-state potassium cryolite molten at the upper layer is sucked out by a siphon pump.

The potassium cryolite ($3/2KF.AlF_3$) prepared is used for aluminum electrolysis industry, the electrolyte system consists of potassium cryolite and aluminum oxide, the temperature for electrolysis can be controlled within a working range from 750° C. to 850° C. by using the electrolyte consisting of the potassium cryolite ($3/2KF.AlF_3$) provided by the invention, and primary aluminum can be obtained by using inert electrode material, carbon electrode material or mixed (co-use of carbon electrode material and inert electrode material) electrode material for electrolysis.

Embodiment 2

1 ton of aluminum is weighed and put in a reactor that is a closed container, argon is fed into the reactor for the purpose of protection after evacuation, the reactor is heated up to 780° C. and then slowly added with dry potassium fluoborate based on a reaction proportion, boron and potassium cryolite (KF.AlF3) are generated after the mixture in the reactor is rapidly stirred for 5 hours, the cover of the reactor is opened and liquid-state potassium cryolite molten at the upper layer is sucked out by a siphon pump.

The potassium cryolite (KF.AlF3) prepared is used for aluminum electrolysis industry, the electrolyte system consists of potassium cryolite and aluminum oxide, the temperature for electrolysis can be controlled within a working range from 750° C. to 850° C. by using the electrolyte consisting of the potassium cryolite (KF.AlF3) provided by the invention, and primary aluminum can be obtained by using inert electrode material, carbon electrode material or mixed (co-use of carbon electrode material and inert electrode material) electrode material for electrolysis.

Embodiment 3

1 ton of aluminum is weighed and put in a reactor that is a closed container, argon is fed into the reactor for the purpose of protection after evacuation, the reactor is heated up to 750° C. and then slowly added with dry mixture of potassium fluoborate and potassium fluotitanate based on a reaction proportion, the molar ratio of potassium fluoborate to potassium fluotitanate is 2:1, titanium boride and potassium cryolite ($6/5KF.AlF_3$) are generated after the mixture in the reactor is rapidly stirred for 5 hours, the cover of the reactor is opened and liquid-state potassium cryolite molten at the upper layer is sucked out by a siphon pump.

The potassium cryolite ($6/5KF.AlF_3$) prepared is used for aluminum electrolysis industry, the electrolyte system consists of potassium cryolite and aluminum oxide, the temperature for electrolysis can be controlled within a working range from 750° C. to 850° C. by using the electrolyte consisting of the potassium cryolite ($6/5KF.AlF_3$) provided by the invention, and primary aluminum can be obtained by using inert electrode material, carbon electrode material or mixed (co-use of carbon electrode material and inert electrode material) electrode material for electrolysis.

Embodiment 4

5 tons of aluminum is weighed and put in a reactor, the reactor is heated up to 750° C. and then slowly added with 2 tons of dry mixture of potassium fluoborate and potassium fluotitanate, the molar ratio of potassium fluoborate to potassium fluotitanate is 1:1, aluminum-titanium-boron alloy and potassium cryolite ($9/7KF.AlF_3$) are generated due to excessive amount of aluminum after the mixture in the reactor is rapidly stirred for 4 hours, the cover of the reactor is opened and liquid-state potassium cryolite molten at the upper layer is sucked out by a siphon pump.

The potassium cryolite ($9/7KF.AlF_3$) prepared is used for aluminum electrolysis industry, the electrolyte system consists of potassium cryolite and aluminum oxide, the temperature for electrolysis can be controlled within a working range from 750° C. to 850° C. by using the electrolyte consisting of the potassium cryolite ($9/7KF.AlF_3$)provided by the invention, and primary aluminum can be obtained by using inert electrode material, carbon electrode material or mixed (co-use of carbon electrode material and inert electrode material) electrode material for electrolysis.

The content discussed above is merely for further detailed description of the invention with reference to the preferred embodiments, and it shall not be considered that the embodiments of the invention are limited to the description only. Many simple deductions or substitutions could be made without departing from the concept of the invention by ordinary skilled in the art to which the invention pertains, and shall be contemplated as being within the scope of the invention.

What is claimed is:

1. A method of producing potassium cryolite comprising:
weighing a quantity of aluminum;
placing the weighed aluminum in a closed reactor;
evacuating the closed reactor;

feeding argon into the reactor after evacuation;
heating the reactor to 780-850° C.;
adding only dry potassium fluoborate to form a balanced mixture of aluminum and potassium fluoborate;
generating only boron and potassium cryolite having a chemical formula $KF.AlF_3$ wherein the balanced mixture reacts according to formula $KBF_4 + Al = B + KF.AlF_3$ while stirring the balanced mixture in the reactor;
opening a cover of the reactor; and
sucking out liquid-state potassium cryolite at an upper layer of the reactor by a siphon pump.

2. The method of claim 1, wherein stirring is processed for 4 or 5 hours.

* * * * *